United States Patent [19]

Mayer et al.

[11] Patent Number: 4,509,106
[45] Date of Patent: Apr. 2, 1985

[54] SELF-HOUSED RECTANGULAR LAMP ASSEMBLY WITH A REPLACEABLE HALOGEN BULB LAMP UNIT

[75] Inventors: William Mayer; Alton E. Runions, both of Rochester, Ill.

[73] Assignee: Stewart-Warner Corporation, Chicago, Ill.

[21] Appl. No.: 392,338

[22] Filed: Jun. 28, 1982

[51] Int. Cl.³ ............................................. F21V 29/00
[52] U.S. Cl. ................................. 362/267; 362/307; 362/306; 362/417; 362/310; 362/371; 362/427; 362/287; 362/375
[58] Field of Search ............... 362/297, 306, 310, 80, 362/417, 427, 429, 430, 267, 287, 307, 371, 375

[56] References Cited

U.S. PATENT DOCUMENTS

| | | | |
|---|---|---|---|
| 3,018,364 | 1/1962 | Wenman | 362/426 X |
| 3,604,916 | 9/1971 | Adra et al. | 362/427 X |
| 4,061,422 | 12/1977 | Geurts et al. | 362/320 X |
| 4,103,323 | 7/1978 | Urbanek | 362/306 |
| 4,164,784 | 8/1979 | Jaksich | 362/427 X |
| 4,188,655 | 2/1980 | Tallon et al. | 362/287 X |
| 4,281,370 | 7/1981 | Masenheimer et al. | 362/426 X |
| 4,317,625 | 3/1982 | Van Allen | 362/16 X |
| 4,357,651 | 11/1982 | Mayer | 362/427 X |
| 4,363,084 | 12/1982 | Dimiceli | 362/427 X |
| 4,412,276 | 10/1983 | Blinow | 362/16 X |
| 4,414,613 | 11/1983 | Mayer | 362/310 X |

*Primary Examiner*—Peter A. Nelson
*Attorney, Agent, or Firm*—Augustus G. Douvas

[57] ABSTRACT

A self-housed rectangular lamp assembly with a replaceable halogen bulb lamp unit. A cup-shaped housing, having a pivotal mounting bracket, receives a lamp unit that has a pair of integral threaded bosses on its rear surface receiving fasteners extending through the rear of the housing to releasably attach the lamp unit within the housing.

7 Claims, 6 Drawing Figures

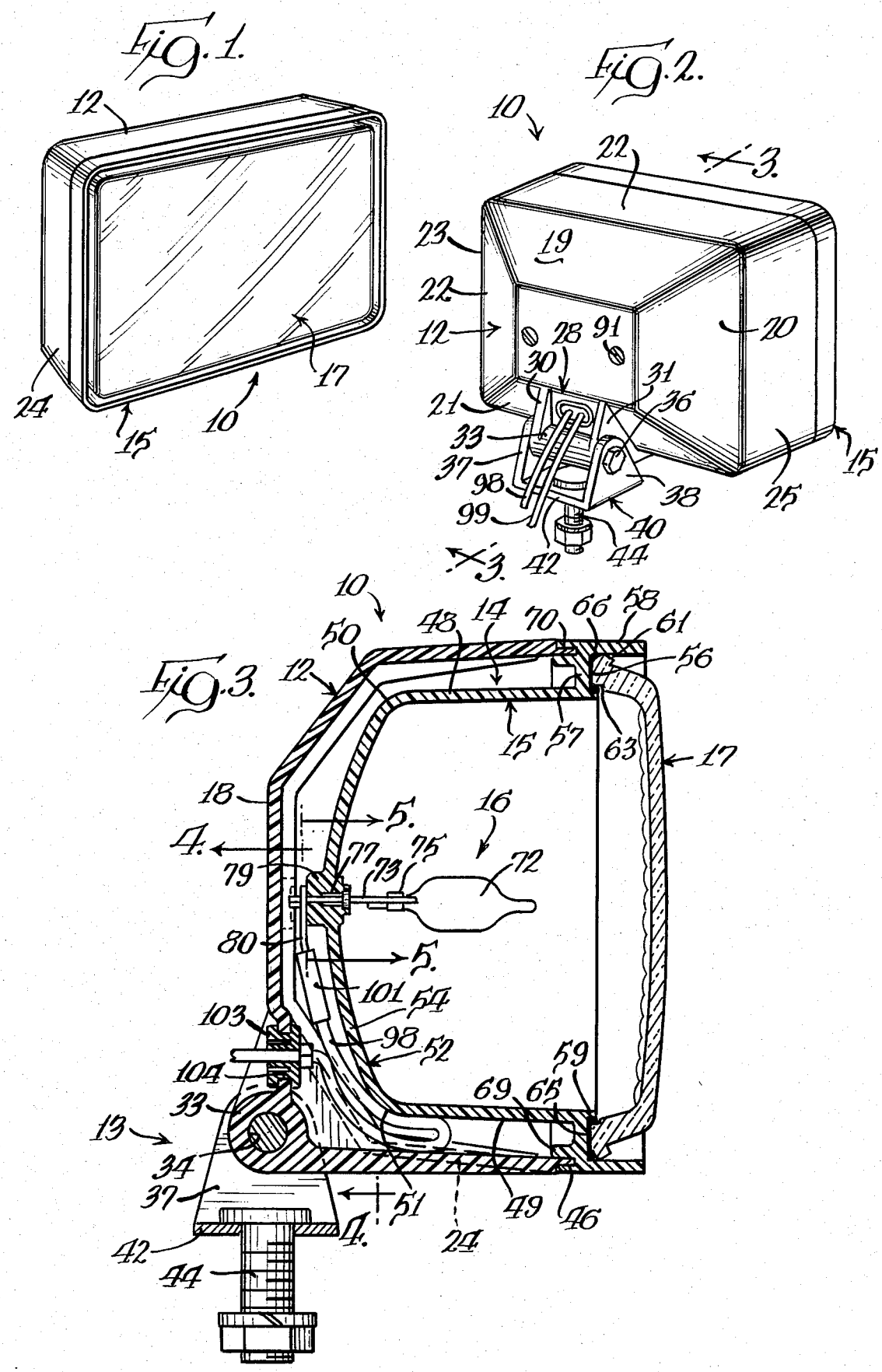

SELF-HOUSED RECTANGULAR LAMP ASSEMBLY WITH A REPLACEABLE HALOGEN BULB LAMP UNIT

BACKGROUND OF THE INVENTION

Vitreous glass sealed beam lamp units have been used for vehicle lighting since at least the 1930's in the United States. These lamps generally include a paraboloidal reflector having a highly mirrorized inner surface that usually has two central openings that receive connectors for a filament aligned within the reflector. The reflector is enclosed by a circular convex lens also constructed of glass that is located with respect to the reflector by various types of integral locating tabs and is joined to the reflector by heat fusion. The connector assemblies are also usually connected to the reflector by a heat fusion process, and the composition and pressure of gas within the reflector-lens envelope are carefully controlled through a filling tube formed integrally with the reflector, and this tube is fused after evacuation and/or, inert gas filling of the lamp envelope. Controlling the atmosphere within the envelope through the filling tube is extremely costly, and the filling tube must be carefully fused at the proper instant to achieve the desired atmosphere within the envelope.

Such a sealed beam lamp unit is shown and described in the D. K. Right U.S. Pat. No. 2,148,314 dated Feb. 21, 1939.

These sealed beam lamp units, which must be replaced after the filaments burn out, require complicated locking rings and adjustment assemblies, permanently carried by the associated vehicle to hold them in proper position. The locking rings frequently include adjusting brackets for varying the attitude of the lamp units to properly adjust the lamp's beam to effect the desired lamp alignment.

It has been suggested that the reflector of a rectangular sealed beam lamp unit be constructed of a plastic material with support flanges formed integrally with the plastic to eliminate the complicated mounting flanges and rings required in prior lamp units. Such a construction is shown in the Thomas T. Talon et al U.S. Pat. No. 4,188,655. This patent discloses a lamp with three integral flanges on a plastic reflector that cooperate with three adjusting assemblies mounted to the vehicle that permit adjustment of the lamp beam in two orthogonal planes. While such an arrangement is suitable for many passenger automobile applications it is nevertheless quite costly because of the three separate fastening and adjusting mechanisms required.

Self-housed lamp units have also been provided in the past that include cup-shaped housings that enclose a replaceable sealed beam lamp unit. These self-housed lamp units are useful for mounting on a vehicle panel with the lamp projecting from the panel as opposed to mounting arrangements where the lamp unit is inserted into an aperture in a vehicle panel (flush mounting). The self-housed lamp units usually require a mounting bracket, usually a pivot mount bracket, to attach the lamp unit to the vehicle panel and also to permit adjustment of the attitude of the lamp as desired by the operator of the vehicle. In the past, one or more mounting rings bezels and sometimes threaded fasteners through the rings and bezels have been required to mount the sealed beam lamp unit within the housing not only adding to the original cost of manufacture of the lamp unit but also making lamp replacement difficult.

It is a primary object of the present invention to ameliorate the above noted problem in sealed beam lamp units and particularly in self-housed lamp units.

SUMMARY OF THE PRESENT INVENTION

In accordance with the present invention a self-housed rectangular lamp assembly with a replaceable lamp unit is provided that does not require locking rings and separate bezels heretofore required in prior known lamp units of this type.

Toward this end the present invention includes a rectangular cup-shaped housing member constructed entirely of molded plastic that has an integral pivot boss projecting from its lower rear side that receives and holds a pivot mounting bracket assembly adapted to attach and hold the lamp assembly to a vehicle panel. The cup-shaped housing has a reduced forwardly extending peripheral rim at its leading or forward edge that locates and assists in holding the replaceable lamp unit in position.

The replaceable lamp unit itself includes a reflector that is also a one-piece plastic molding. The reflector is also constructed of an impact resistant polyester plastic such as "Petlon" manufactured by Mobay Chemical Company, and is generally rectangular in configuration with a highly mirrorized coating on a paraboloidal inner surface that reflects light from a halogen bulb unit mounted therein through a rectangular lens constructed of either plastic or vitreous glass material. The lens, rather than being fused to the reflector as in vitreous sealed beam lamps, is joined with the rectangular reflector by an epoxy adhesive in a forwardly opening rectangular recess formed integrally in the reflector.

During manufacture, the halogen bulb unit is assembled with a pair of parallel spaced connector pins that are coated with an epoxy adhesive and inserted into a pair of parallel spaced bores in the rear of the reflector. Terminals that are pressed into the rear of the reflector are welded onto the projecting ends of these connector pins. Then epoxy adhesive is applied to the forwardly opening lens recess in the reflector and the lens inserted therein. The reflector and lens assembly is then baked in an oven at a temperature and for a time sufficient to cure the epoxy material and permanently bond the lens to the reflector and the connector pins in the rear reflector bores. The heating times and temperatures required to cure the epoxy adhesive for the lens do not alter the position of the halogen bulb in the reflector and cause distortion of the mirrorized reflector paraboloidal surface, thus the significant distortion problems that occur during the manufacture of vitreous sealed beam lamp units are eliminated.

An important aspect of the present invention is the provision of an integral outwardly extending flange at the forward end of this plastic reflector that has a rectangular rearwardly opening peripheral recess that receives the forwardly projecting rim of the housing. This tongue and groove type joint very accurately locates the reflector with respect to the cup-shaped housing. It is also very simple to insert and locate the lamp unit in the housing by grasping the lamp unit by this forward integral flange and inserting it into the housing until the housing rim seats in the flange recess. No mounting rings or separate bezels whatsoever are required.

The rear of the reflector has a pair of integrally formed threaded mounting bosses that receive a pair of threaded fasteners extending through the rear of the housing. These fasteners draw the reflector and the entire lamp unit rearwardly into the housing and hold it in position.

When the lamp unit needs to be replaced it is only necessary to unthread the two fasteners at the rear of the housing and grasp and pull the reflector flange and the entire lamp unit will pull out of the housing.

BRIEF DESCRIPTION OF THE DRAWINGS

FIG. 1 is a perspective view of a self-housed rectangular lamp assembly according to the present invention;

FIG. 2 is a rear perspective view of the self-housed lamp assembly shown in FIG. 1;

FIG. 3 is an enlarged longitudinal section of a self-housed lamp assembly according to the present invention taken generally along line 3—3 of FIG. 2;

DETAILED DESCRIPTION OF THE PREFERRED EMBODIMENT

Figure 4:
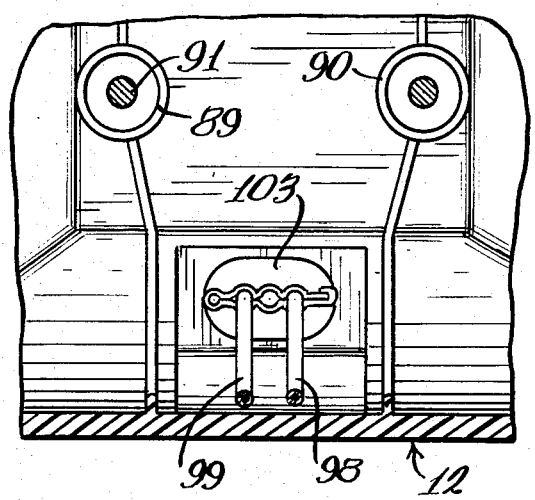
FIG. 4 is an enlarged fragmentary view taken generally along line 4—4 of FIG. 3 illustrating the fastener receiving openings in the housing.

Referring to the drawings and particularly FIGS. 1 to 3 a self-housed lamp assembly 10 according to the present invention is illustrated generally including a cup-shaped outer rectangular housing 12 having a pivotal mounting bracket assembly 13 attached thereto and a replaceable sealed beam lamp unit 14 mounted within the housing 12. The replaceable lamp unit 14 includes a one-piece plastic reflector 15 with a halogen bulb unit 16 mounted therein enclosed by a rectangular forward lens 17 constructed of vitreous glass or plastic.

An important aspect of the present invention is that the housing 12 and the reflector 15 are each constructed entirely of a one-piece plastic molding of an impact resistant plastic. One plastic that has been found particularly suitable is a polyester "Petlon" manufactured by Mobay Chemical Company. This plastic is durable, shock resistant and it also withstands a broad range of temperature variations.

The plastic housing member 12 is a one-piece injection molded part and is seen to be generally cup-shaped in configuration with rectangularly arranged outer walls. As seen in FIGS. 1 to 3, housing 12 includes a flat rear wall 18 frusto-perimidal intermediate walls 19, 20, 21 and 22 and slightly tapered frusto-perimidal side walls 22, 23, 24 and 25. The side walls 22 and 24 slope together slightly at an angle of about 10 degrees with a horizontal plane in the plane of FIG. 3, and the side walls 24 and 25 slope rearwardly together at an angle of about 18 degrees with respect to a vertical plane through the axis of the reflector 15.

A pivot mounting boss 28 is integrally molded on the lower intermediate wall 21 of the housing 12 and includes flanges 30 and 31 connected by a cylindrical boss portion 33 having a central bore 34 therethrough that receives a fastener 36 extending through upwardly turned legs 37 and 38 on a U-shaped metal bracket member 40. Bracket 40 has a bight portion 42 having a central aperture therein that receives a flat headed threaded mounting fastener 44 that is adapted to extend through a vehicle panel and lock the bracket and the lamp assembly 10 to the associated vehicle. By loosening the threaded fastener 36 the lamp assembly 10 may be pivoted to any desired position in a vertical plane extending through the axis of the lamp and then locked by tightening the fastener 36 to maintain the desired position. Fastener 36 clamps bracket legs 37 and 38 against the boss side flanges 30 and 31.

The housing member 12 has an integral reduced thickness forwardly extending peripheral rim 46 that has a generally rectangular shape to locate the reflector 15 in the housing 12 as will appear more clearly hereinbelow.

The plastic reflector 15 includes generally flat top and bottom walls 48 and 49 having arcuate rear ends 50 and 51 connected together by central paraboloidal wall 52. Walls 48, 49 and 52 have a common inner surface 54 that is mirrorized by metalic vacuum deposition or other suitable process to provide the necessary reflective characteristics for the interior of the reflector to direct and focus light, emitting from halogen bulb assembly 16, forwardly from the lamp unit 14 along its geometric axis through lens 17.

The forward end of the reflector 15 has a rectangular forwardly opening lens receiving recess 56 that is defined by outwardly extending integral wall 57, forwardly extending integral wall 58, and a rim 59 extending forwardly from the walls 48, 49 and 52. The walls 57 and 58 and rim 59 extend peripherally completely around the reflector 15. The wall 58 serves to define part of recess 56 and also forms a hood or shield around lens 17 to protect the lens and limit straylight emission from the lamp unit in a direction perpendicular to its optical axis.

The lens 17 may be constructed of vitreous glass or plastic, either transparent or translucent and is seen to have an outer peripheral flange 61 having a beveled rear surface and an inner corner recess 63 that fits over and seats against the end of the projecting rim 59. The position of the recess 63 locates rear surface 65 of the reflector spaced slightly from the bottom surface of recess 56 to form a pocket with the beveled flange 61 in the recess for an epoxy adhesive 66 that extends all around the recess 56.

The reflector outwardly extending integral wall 57 has an integral rearwardly projecting peripheral flange 69 that has a forwardly extending peripheral slot therein sized to closely receive and locate the forwardly directed locating rim 46 on the reflector 12. This construction enables the reflector 15 to be accurately located within the housing 12 without the need for any additional locating rings or bezels.

The halogen bulb assembly 16 includes a halogen bulb 72, aligned on the optical axis of the paraboloidal wall 52, that has two spaced parallel connector pins 73 welded to leads extending from bulb 72, and the bulb is supported on one of the connector pins 73 by a strap 75. Pins 73 extend through a pair of aligned spaced parallel through bores 77 in the rear of the paraboloidal wall 52 and a rearwardly extending integral boss 79 as seen in FIGS. 5 and 6.

Figure 5:
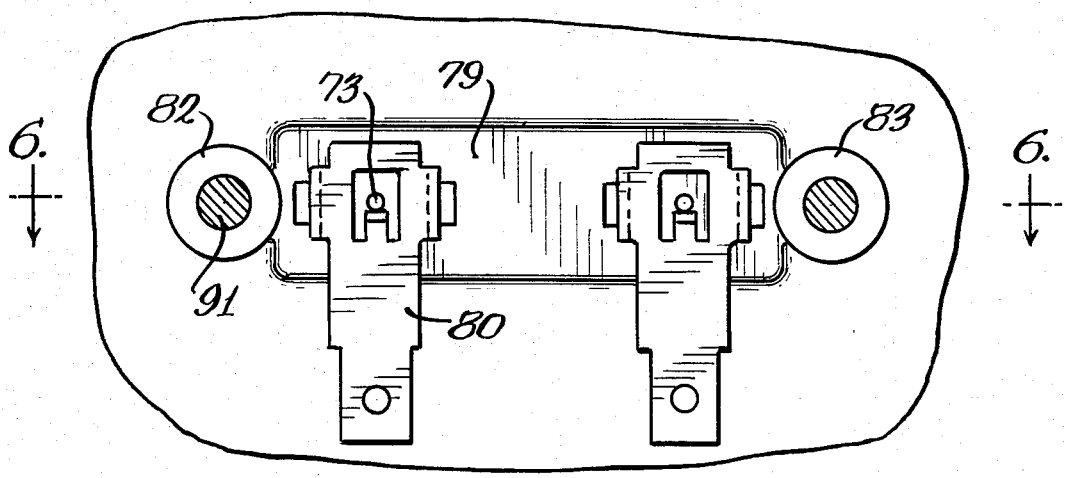
FIG. 5 is an enlarged fragmentary view taken generally along line 5—5 of FIG. 3 illustrating the reflector mounting bosses seated in the rear of the housing.
Figure 6:
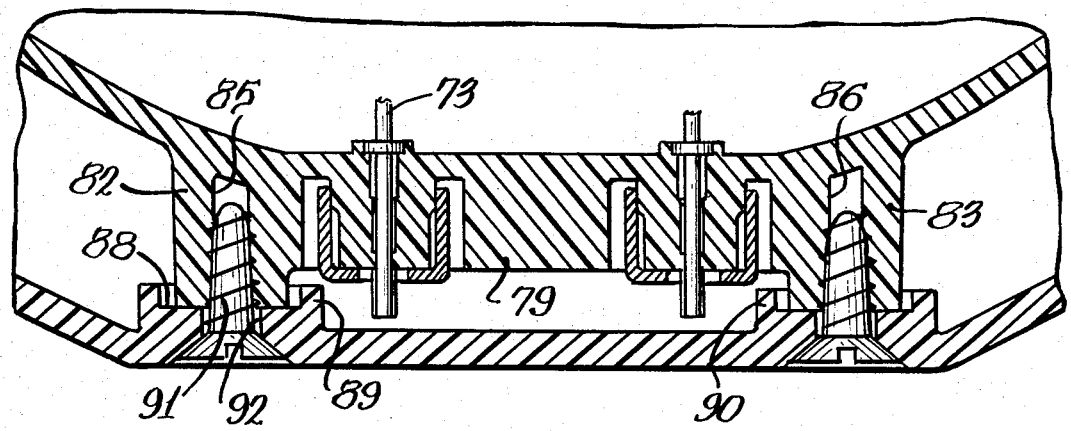
FIG. 6 is an enlarged fragmentary view taken generally along line 6—6 of FIG. 5.

The reflector 15 has a pair of integral, spaced parallel mounting bosses 82 and 83 positioned adjacent either side of the rectangular boss 79 as seen in FIGS. 5 and 6. The mounting bosses 82 and 83 have parallel closed end bores 85 and 86 therein with axes that lie in a central horizontal plane perpendicular to the plane of FIG. 3. The ends of the bosses extend into a pair of counterbores 88 in circular bosses 89 and 90 formed integrally with and projecting forwardly inside the housing member 12. A pair of self-threading tapered screws 91 extend through bores 92 in the bosses 89 and 90 and into the bores 85 and 86 in the reflector bosses 82 and 83 to hold and lock the bosses 82 and 83 in the counter-bores 88 in the housing bosses 89 and 90. During assembly or replacement of the lamp unit 14, the unit is inserted within the housing 12 and the housing forward locating rim 46 is fitted into the reflector flange slot 70. Self-tapping screws 91 are then inserted through the housing rear bores 92 and threaded into the reflector boss bores 85 and 86 drawing the lamp unit 14 to its fully seated position illustrated in FIGS. 3 and 6.

A pair of leads 98 and 99 are attached by suitable connectors 101 to the terminals 80 and are looped between the reflector and the lower portion of the housing 12 as seen in FIG. 3, and then extend outwardly from the lower rear of the housing through grommet 103 positioned in opening 104 in the lower intermediate wall 21 of housing 12. Alternatively, the leads 98 and 99 may be threaded through an axially bore in threaded fastener 44 to reduce external lead exposure.

We claim:

1. A self-housed rectangular lamp assembly having a replaceable lamp unit, comprising; a reusable cup-shaped housing member having a generally rectangular frontal configuration, a lamp unit adapted to be replaceably mounted in the housing member having a one-piece plastic reflector with a paraboloidal mirrorized inner surface, a halogen bulb unit mounted within the reflector, a lens enclosing the front of the reflector, axially interengaging alignment elements extending forwardly from a forward portion of the housing member and rearwardly from a forward portion of the reflector for holding the reflector in proper alignment in the housing member, a mounting projection formed integrally with and extending rearwardly from the reflector, and fastener means connected to the rear of the housing member and engageable with the reflector projection for drawing and holding the reflector and lamp unit in the housing member with the alignment elements interengaged without the need for any locking rings.

2. A self-housed rectangular lamp assembly having a replaceable lamp unit, as defined in claim 1, including a flange extending outwardly from the forward end of the reflector, said housing member having a forwardly extending portion adjacent the flange, a recess on one of the reflector flange and the housing forward portion, and an axially extending rim on one of the reflector flange and the housing forward portion received in the recess, said rim and recess being positioned so that the fastener means draws the rim into the recess as the lamp unit is fastened to the housing member.

3. A self-housed rectangular lamp assembly having a replaceable lamp unit, as defined in claim 1, wherein the mounting projection includes a pair of integral spaced bosses with bores extending rearwardly from the reflector, and a pair of bores in the housing aligned with the bores in the reflector bosses, said fastener means including a pair of threaded fasteners each extending through one of the housing bores and threadedly engaging one of the bores in one of the reflector bosses.

4. A self-housed rectangular lamp assembly having a replaceable lamp unit, as defined in claim 2, wherein the recess is a rectangular peripheral recess in the rear of the reflector flange extending all around the reflector, and said rim being a forwardly extending rectangular peripheral rim on the forward portion of the housing.

5. A self-housed rectangular lamp assembly having a replaceable lamp unit, as defined in claim 1, including a pivot boss formed integrally with and extending rearwardly from the housing, a mounting bracket pivotally connected to the housing boss so that the lamp unit may be mounted in the desired position on a vehicle panel.

6. A self-housed rectangular lamp assembly having a replaceable lamp unit, comprising; a one-piece plastic cup-shaped housing member having a forwardly extending rim portion, a pivotally adjustable bracket assembly mounted on the lower portion of the housing member so that the lamp assembly may be pivotally adjusted, a lamp unit in the housing member including a one-piece plastic reflector having a paraboloidal mirrorized inner surface, said reflector having an outwardly extending flange at the forward end thereof with a rearwardly opening recess therein in axial alignment with the housing member rim portion and engageable therewith to align the reflector in the housing member, a halogen bulb unit in the reflector having connector pins extending through and supported in the reflector, a lens enclosing the reflector, at least one integral boss extending rearwardly from the reflector, and a fastener extending through the rear of the housing member into the reflector boss for drawing the reflector into the housing member and for drawing the reflector recess over the forwardly extending rim portion of the housing member to hold the lamp unit in the housing member without the need for any locking rings.

7. A rectangular lamp assembly with a replaceable lamp unit, comprising; a cup-shaped plastic housing having a rectangular forwardly extending wall with a reduced peripheral rim at the forward end thereof, a sealed beam lamp unit in the housing having a one-piece plastic reflector with a paraboloidal mirrorized inner surface, a halogen bulb unit in the reflector with a pair of spaced connector pins extending through the rear of the reflector, terminals connected to the rear of the reflector and the connector pins, a lens enclosing the front of the reflector, said reflector having an integral outwardly extending peripheral flange at the forward end thereof having a rearwardly opening peripheral recess therein receiving the forward housing rim for positioning the forward end of the reflector in the housing, said reflector having a pair of rearwardly extending integral bosses, and a pair of threaded fasteners extending through the rear of the housing and into the bosses for holding the reflector in the housing.

* * * * *